United States Patent [19]
Elliot

[11] 3,913,396
[45] Oct. 21, 1975

[54] MONITORING SYSTEM FOR MOORED FLOATING VESSELS

[75] Inventor: George Elliot, Glasgow, Scotland

[73] Assignee: British Secretary of State for Trade and Industry, London, England

[22] Filed: Dec. 27, 1974

[21] Appl. No.: 537,009

Related U.S. Application Data

[63] Continuation of Ser. No. 355,111, Apr. 27, 1973, abandoned.

[30] Foreign Application Priority Data

Apr. 28, 1972 United Kingdom............... 19838/72

[52] U.S. Cl................................... 73/143; 114/230
[51] Int. Cl.² .......................................... G01L 5/10
[58] Field of Search................. 73/143, 144, 88.5 R; 114/230, 5 R, 144 B; 340/29

[56] References Cited
UNITED STATES PATENTS

| | | | |
|---|---|---|---|
| 2,530,184 | 11/1950 | Statham............................ | 73/88.5 R |
| 3,027,957 | 4/1962 | Orr.................................... | 73/88.5 R X |
| 3,248,937 | 5/1966 | Vincent............................. | 73/88.5 R X |
| 3,330,154 | 7/1967 | Habern et al...................... | 73/143 |
| 3,759,094 | 9/1973 | Al...................................... | 73/143 |
| 3,810,081 | 5/1974 | Rininger........................... | 73/143 X |

Primary Examiner—Charles A. Ruehl
Attorney, Agent, or Firm—Elliott I. Pollock

[57] ABSTRACT

A monitoring system for a floating vessel moored by a plurality of mooring ropes to respective anchoring devices on a shore-based or otherwise relatively fixed installation comprises a tension measuring device for measuring the tension produced at each anchoring device and producing a signal in accordance with the tension, and means for transmitting the signal from each tension measuring device to a monitoring station, the monitoring station having indicating means for indicating the strength of the signal received from each tension measuring device relative to the signal strength produced when the tension in the anchoring device and hence in the respective mooring rope reaches a predetermined value, whereby the monitoring system can be used to assist control of the vessel and/or individual ropes to reduce the possibility of the tension in any rope reaching the predetermined value.

6 Claims, 4 Drawing Figures

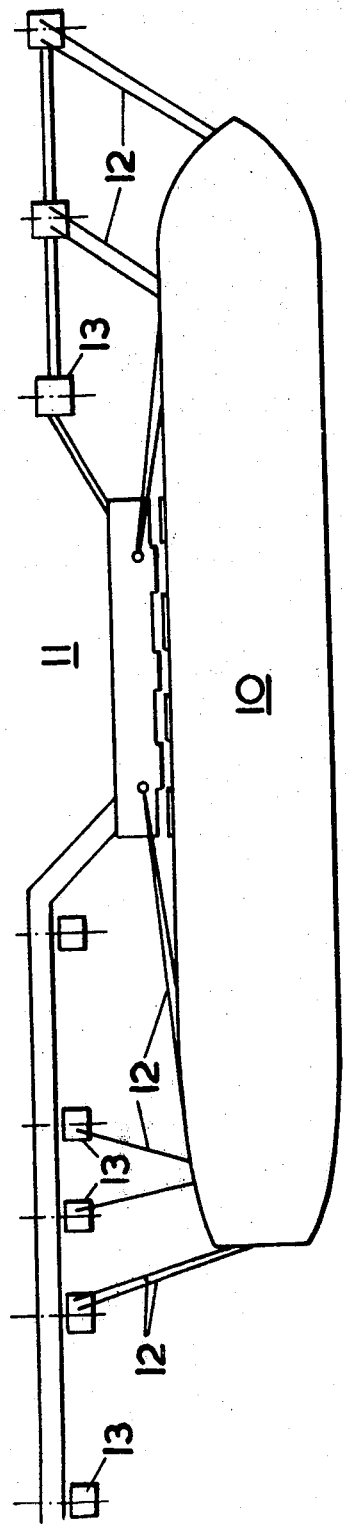
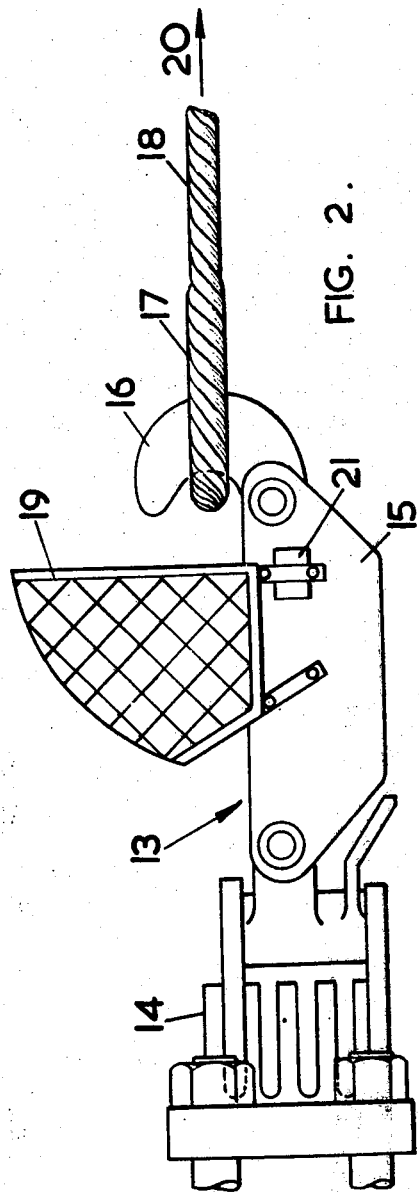
FIG. 1.
FIG. 2.

MONITORING SYSTEM FOR MOORED FLOATING VESSELS

This is a continuation of application Ser. No. 355,111, filed Apr. 27, 1973, now abandoned.

This invention relates to a monitoring system for a moored floating vessel.

When a floating vessel, particularly a large vessel such as a tanker over 100,000 tons, is moored to a jetty or buoy by a number of mooring ropes, changes in tidal, wind or ballast conditions may result in movement of the vessel such that one or more of the mooring ropes is overstrained, possibly to breaking point.

It is an object of this invention to provide an arrangement whereby the development of such a situation can be alcognized and the position of the vessel can be corrected accordingly, with the minimum interference with normal mooring operations. A particular advantage of this invention is that a vessel can be loaded or unloaded for longer periods as the arrangement provides a more effecient warning system of the onset of hazardous conditions.

According to the invention a monitoring system for a floating vessel moored by a plurality of mooring ropes to respective anchoring devices on a shore-based or otherwise relatively fixed installation comprises a tension measuring device for measuring the tension produced at each anchoring device and producing a signal in accordance with the tension, and means for tranmitting the signal from each tension measuring device to a monitoring station, the monitoring station having indicating means for indicating the strength of the signal received from each tension-measuring device relative to the signal strength produced when the tension in the anchoring device and hence in the respective mooring rope reaches a predetermined value, whereby the monitoring system can be used to assist control of the vessel and/or individual ropes to reduce the possibility of the tension in any rope reaching the predetermined value.

Preferably the monitoring station may be on the vessel. Alternatively the monitoring station may be on shore, or monitoring stations may be provided both on shore and on the vessel.

The tension measuring device for measuring the tension at each anchoring device in the form, for example, of a jetty hook, may be a strain gauge device attached to a part of the jetty hook in which the tension is related to the tension in the mooring rope.

Alternatively, the tension measuring device for measuring the tension at each anchoring device in the form, for example, of the shore end of a shore line (that is to say a mooring rope which is attached substantially permanently to the shore) may be a strain gauge device, such as a load cell, connected in series with said shore end of said shore line. The line cannot be released at the shore end because the device would then be damaged or destroyed probably by falling into the sea.

Each strain gauge device comprises four strain gauges arranged to form an electrical bridge circuit having, at the monitoring station, conventional means for displaying visually the signal from each strain gauge device, and, optionally, alarm means to indicate a predetermined tension such as a maximum or minimum tolerable tension at any anchoring device.

The invention will now be described by way of example only with reference to the accompanying drawings in which:

FIG. 1 illustrates schematically a moored floating vessel;

FIG. 2 illustrates a typical jetty hook, a mooring rope and a strain gauge device;

Figure 3:
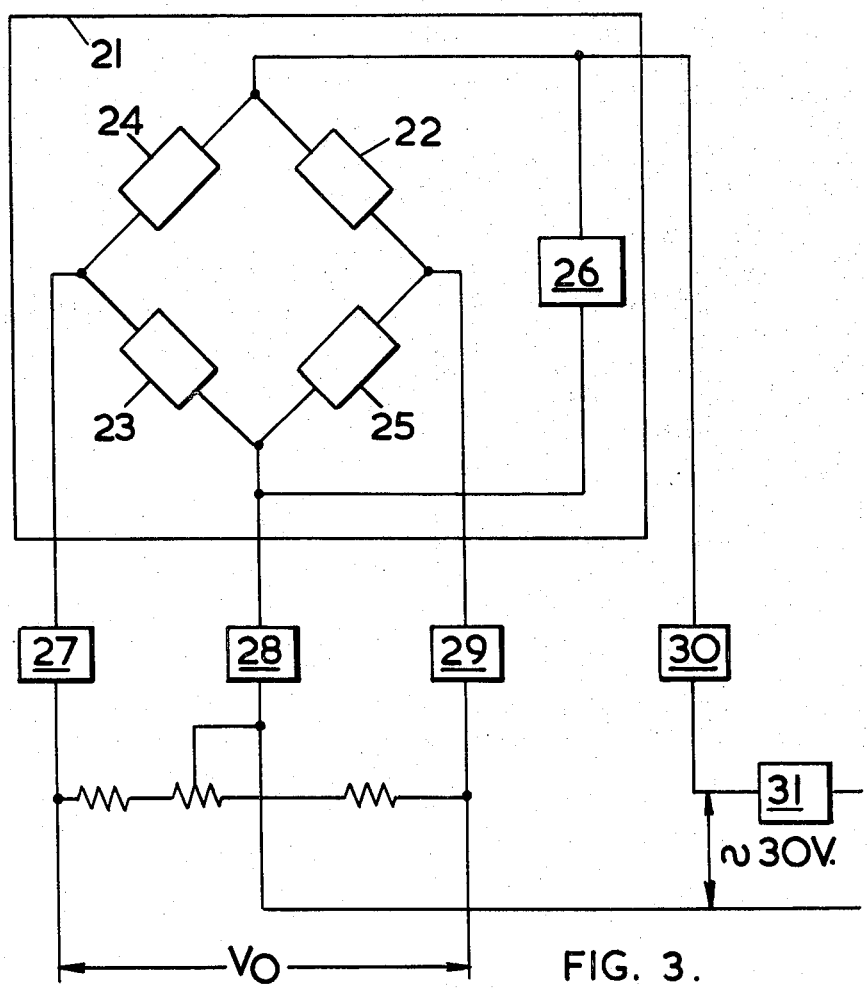
FIG. 3 illustrates an electrical bridge circuit for a strain gauge device.

In FIG. 1 a ship 10 is moored to a jetty 11 by a number of mooring ropes 12 which are attached to anchoring device 13 shown in more detail in FIG. 2. Each device 13 comprises a base 14 rigidly attached to the jetty 11 and connected through a hook plate 15 to a hook 16; the hook plate 15 and hook 16 comprise a quick-release jetty hook. A rope sling 17 of a mooring rope 18 is looped over the hook 16, a guard 19 can pivot to cover the hook 16 and rope sling 17, and the rope 18 is attached to the ship 10 in the direction indicated by arrow 20.

A strain gauge device 21 is bonded to the hook plate 15 and is connected electrically as shown in FIG. 3. Each strain gauge device 21 comprises two active strain gauges 22, 23, which together provide a signal of suitable magnitude, two passive strain gauges 24, 25 which act as temperature compensation elements, and a shunt resistor 26 which compensates for the small differences in calibration from hook to hook and for the signal transmitting means, in this embodiment the resistances of the connecting cables, represented schematically at 27, 28, 29 and 30. Such a shunt resistor 26 allows each strain gauge 21 and jetty hook 15, 16 to be interchangeable in position on a jetty.

The strain gauge device 21 is supplied through an amplifier 31 with about 30 volts and 20 mA constant current and the voltage developed by the strain gauges 22, 23 is indicated by voltage $V_o$ which can be detected and indicated at the monitoring station.

Figure 4:
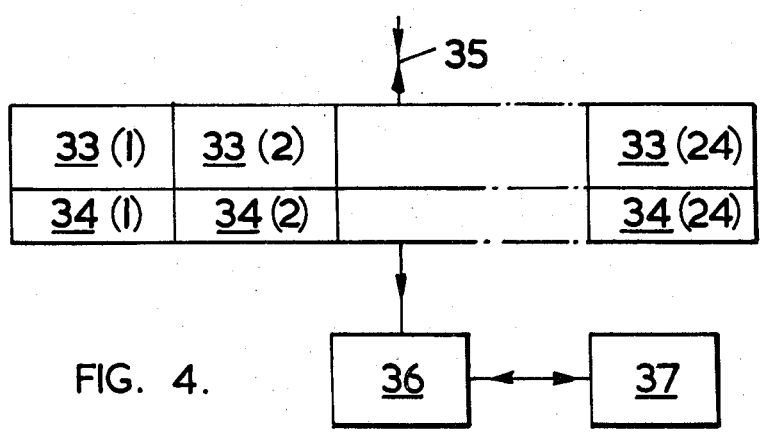
FIG. 4 illustrates a monitoring station having means for indicating the signal received from twenty four strain gauge devices.

In FIG. 4, 24 supply channels 33(1) to 33(24), each with an associated amplifier 34(1) to 34(24), supply 2 mA constant current to each of 24 strain gauge devices (not shown) the connections being represented schematically at reference 35. The signal from the strain gauge device associated with each channel is amplified by the associated amplifier 34 and fed to a visual display device 36 on the vessel 10 on which all 24 signals can be displayed simultaneously. The visual display device 36 is connected to an alarm 37 which may be of any conventional type and may be arranged to give an audible or visible signal when a signal from any strain gauge device reaches a predetermined maximum or minimum level.

It will be understood that additional or alternative components may be added to the circuit of FIG. 4. For example, the 24 signals may be displayed on a chart recorder or may be printed out on punch tape, if such a permanent record is required, and such display may be at the monitoring station on the vessel 10 or on shore.

Each strain gauge device and jetty hook must be calibrated by conventional methods before use, and the appropriate shunt resistor 26 can then be connected into the device.

The circuits described with reference to FIGS. 3 and 4 relate to a strain gauge device bonded to the hook plate of a jetty hook. Similar circuits would be used when the means for measuring the tension at each anchoring device is a load cell in series with the shore end of a shore line.

What I claim is:

1. A monitoring system for a floating vessel moored by a plurality of mooring ropes to respective jetty hooks disposed at widely spaced locations on a shore-based or otherwise relatively fixed installation, said system comprising a strain gauge device attached to a part of each jetty hook in which the tension is related to the tension in the mooring rope, said device producing a signal in accordance with the tension, a monitoring station, and means for transmitting the signal from each strain gauge device to the monitoring station, the monitoring station having indicating means for indicating the strength of the signal received from each strain gauge device relative to the signal strength produced when the tension in the jetty hook and hence in the respective mooring rope reaches a predetermined value, whereby the monitoring system can be used to assist control of the vessel and/or individual ropes to reduce the possibility of the tension in any rope reaching the predetermined value.

2. A monitoring system according to claim 1 including alarm means in said monitoring station for indicating when a predetermined tension is reached in any jetty hook.

3. A monitoring system according to claim 1 in which each strain gauge device comprises four strain gauges arranged to form an electrical bridge circuit connected to the monitoring station, said monitoring station including means for displaying visually the signal from each strain gauge device.

4. A monitoring system for a floating vessel moored by a plurality of mooring ropes to respective anchoring devices disposed at widely spaced locations on a shore-based or otherwise relatively fixed installation, each anchoring device including a releasable portion for separable engagement with its associated mooring rope and each anchoring device also including an anchoring portion spaced from said releasable portion by an intervening body portion for fixedly attaching said anchoring device to the relatively fixed installation, a tension meausring device attached to a region of the intervening body portion of each anchoring device in which the tension is related to the tension in the mooring rope associated with that anchoring device, each tension measuring device producing a signal in accordance with the tension, a monitoring station, and means for transmitting the signals from all of said tension measuring devices to the monitoring station, said monitoring station having indicating means for indicating the strength of the signal received from each tension measuring device relative to the signal strength produced when the tension in the anchoring device and hence in its respective mooring rope reaches a predetermined value, whereby the monitoring system can be used to assist control of the vessel and/or individual mooring ropes to reduce the possibility of the tension in any rope reaching said predetermined value.

5. A monitoring system according to claim 4 including alarm means in said monitoring station for indicating when a predetermined level of tension is reached in the body portion of any anchoring device.

6. A monitoring system according to claim 4 in which each tension measuring device comprises a separate strain gauge device.

* * * * *